United States Patent
Chen et al.

(10) Patent No.: US 8,849,342 B2
(45) Date of Patent: Sep. 30, 2014

(54) ELECTRONIC DEVICE AND METHOD FOR MANAGING PHONE CALL

(71) Applicant: Chi Mei Communication Systems, Inc., New Taipei (TW)

(72) Inventors: Yun-Ju Chen, New Taipei (TW); Shu-Yun Huang, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 27 days.

(21) Appl. No.: 13/726,253

(22) Filed: Dec. 24, 2012

(65) Prior Publication Data
US 2013/0172053 A1 Jul. 4, 2013

(30) Foreign Application Priority Data
Dec. 28, 2011 (TW) .............................. 100149216 A

(51) Int. Cl.
*H04M 1/00* (2006.01)
*H04M 1/725* (2006.01)
*H04M 1/02* (2006.01)

(52) U.S. Cl.
CPC ........ *H04M 1/0202* (2013.01); *H04M 1/72519* (2013.01); *H04M 2250/22* (2013.01)
USPC .................. 455/550.1; 455/456.6; 455/456.1; 345/173

(58) Field of Classification Search
CPC . H04W 64/00; H04W 1/72519; G06F 3/0488
USPC .................. 455/550.1, 456.6, 456.1; 345/173
See application file for complete search history.

(56) References Cited

U.S. PATENT DOCUMENTS

| | | | |
|---|---|---|---|
| 2002/0082017 A1* | 6/2002 | Hattori | 455/436 |
| 2003/0224855 A1* | 12/2003 | Cunningham | 463/41 |
| 2008/0201069 A1* | 8/2008 | Suzuki | 701/204 |
| 2011/0009128 A1* | 1/2011 | Nomura | 455/456.1 |
| 2011/0039572 A1* | 2/2011 | Lamb et al. | 455/456.1 |
| 2012/0072114 A1* | 3/2012 | Sato et al. | 701/538 |
| 2012/0157073 A1* | 6/2012 | Kim et al. | 455/418 |
| 2012/0214546 A1* | 8/2012 | Osaka | 455/556.1 |

\* cited by examiner

*Primary Examiner* — Danh Le
(74) *Attorney, Agent, or Firm* — Novak Druce Connolly Bove + Quigg LLP

(57) ABSTRACT

A method for managing phone call using an electronic device. The electronic device displays an incoming call interface on a touch panel of the electronic device when the electronic device receives an incoming call. The electronic device determines a moving direction of a control button if a moving distance of the control button is greater a predetermined distance. The electronic device answers the incoming call if the moving direction of the control button is toward an answer area, and declines the incoming call if the moving direction of the control button is toward a decline area.

18 Claims, 7 Drawing Sheets

ELECTRONIC DEVICE AND METHOD FOR MANAGING PHONE CALL

BACKGROUND

1. Technical Field

Embodiments of the present disclosure relate to management technology, and particularly to an electronic device and method for managing phone call.

2. Description of Related Art

When the electronic device receives an incoming call, the electronic device provides an interface on a touch panel to answer the incoming call or decline the incoming call. The interface for incoming calls of related art includes an answer button and a decline button. The incoming call is answered when the user touches the answer button on the touch panel, and the incoming call is declined when the user touches the decline button on the touch panel. However, using two buttons to respond to a call takes up real estate on the electronic device. Thus, there is room for improvement in the art.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one."

In general, the word "module," as used herein, refers to logic embodied in hardware or firmware, or to a collection of software instructions, written in a programming language. One or more software instructions in the modules may be embedded in firmware, such as in an erasable programmable read only memory (EPROM). The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
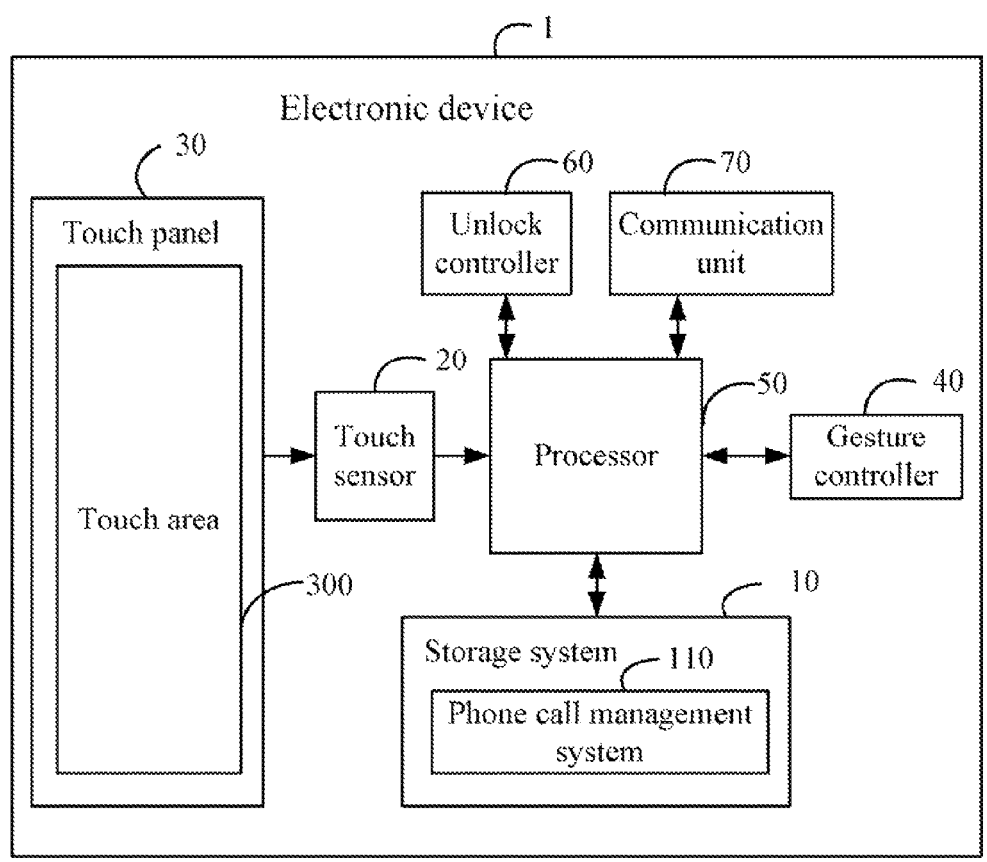
FIG. 1 is a schematic block diagram of one embodiment of an electronic device including a phone call management system.

FIG. 1 is a block diagram of one embodiment of an electronic device 1. The electronic device 1 includes a phone call management system 110 stored in a storage system 10. The phone call management system 110 may be used to manage an incoming call received by the electronic device 1. In one embodiment, the electronic device 1 further includes a touch sensor 20, a touch panel 30, a gesture controller 40, a processor 50, an unlock controller 60, and a communication unit 70. The storage system 10, the touch sensor 20, the gesture controller 40, the unlock controller 60 and the communication unit 70 are connected to the processor 50. The touch sensor 20 is further connected to the touch panel 30. The touch panel 30 includes a touch area 300, a user can use a finger or stylus to touch the touch area 300 for operations (e.g., word input or starting an application). The touch sensor 20 controls the touch panel 30 and receives data (e.g., coordinates of touch points when the user touches on the touch area of the touch panel 30) from the touch panel 30. The touch sensor 20 may be, but is not limited to, a touch integrated circuit (IC). Furthermore, the processor 50 may be, but is not limited to, a central processing unit (CPU) or a system on a chip (SOC).

Figure 4:
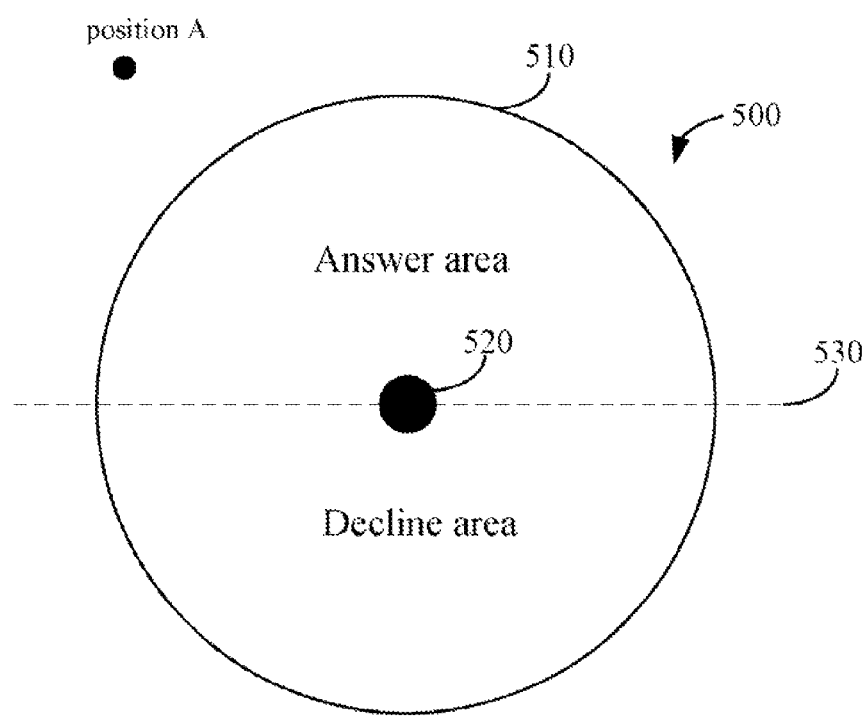
FIG. 4 illustrates one embodiment of a first incoming call interface.
Figure 5:
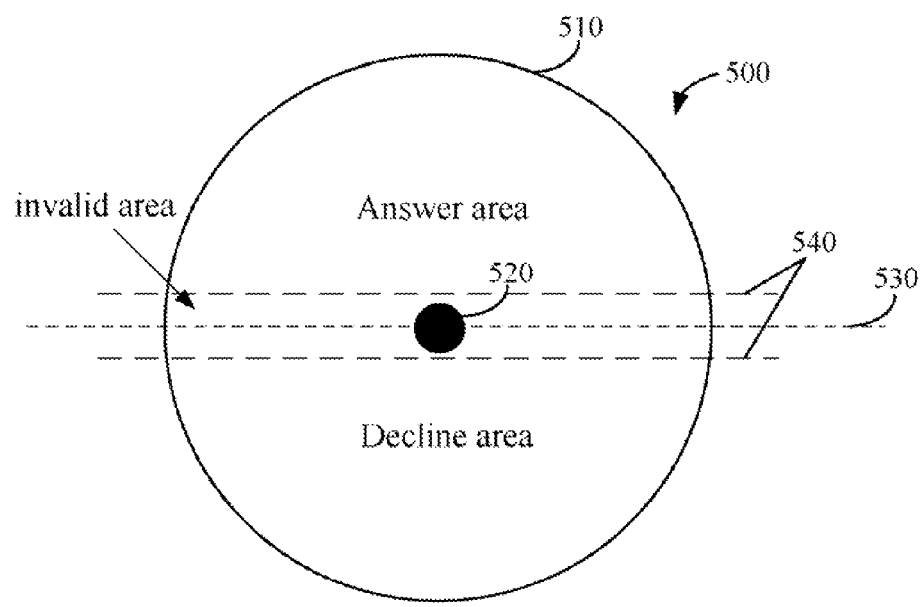
FIG. 5 illustrates one embodiment of a second incoming call interface.
Figure 6:
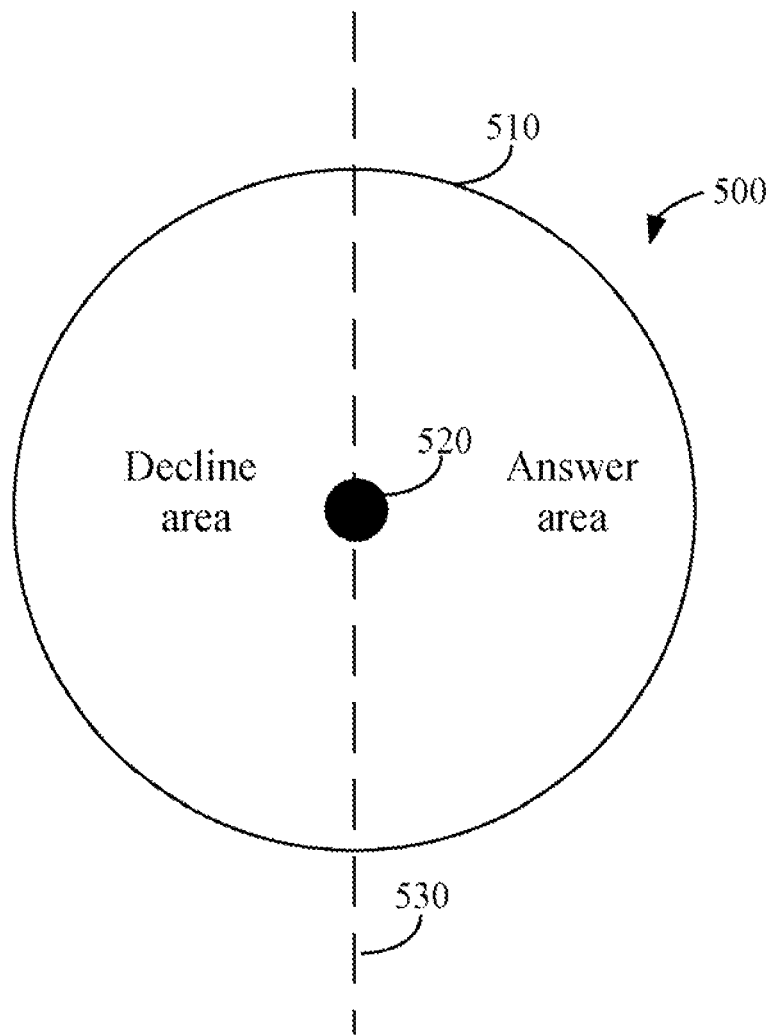
FIG. 6 illustrates one embodiment of a third incoming call interface.
Figure 7:
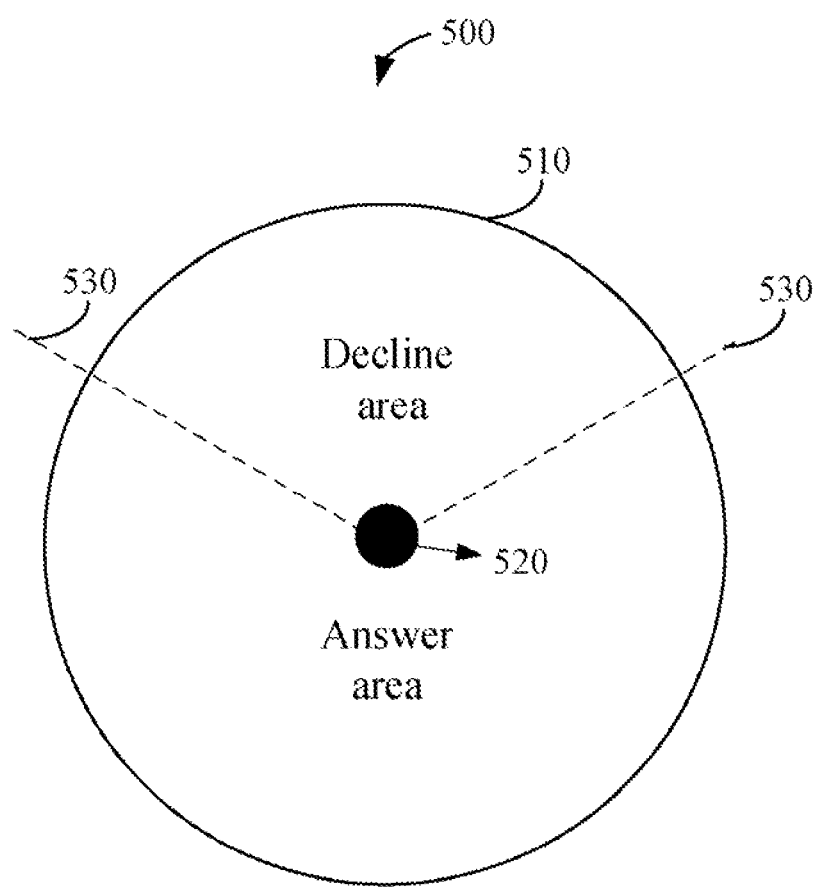
FIG. 7 illustrates one embodiment of a fourth incoming call interface.

The storage system 10 stores one or more incoming call interfaces 500. Referring to FIG. 4 to FIG. 7, the incoming call interfaces 500 are displayed on the touch panel 30 when the electronic device receives the incoming call. Each of the incoming call interfaces 500 includes a circular area 510 and a control button 520. The control button 520 is initially positioned at the centre of the circular area 510. The circular area 510 is divided into two equal or unequal parts, namely an answer area and a decline area, by one or two lines 530 which pass through the center of the circular area 510. The incoming call is answered when the control button 520 is dragged by the user to the answer area, and is declined when the control button 520 is dragged by the user to the decline area. The one or more incoming call interfaces include a first incoming call interface as shown in FIG. 4, a second incoming call interface as shown in FIG. 5, a third incoming call interface as shown in FIG. 6, and a fourth incoming call interface as shown in FIG. 7. As shown in FIG. 4, the circular area 510 is divided into the answer area and the decline area by a horizontal line 530. As shown in FIG. 5, the circular area 510 is divided into the answer area and the decline area by the horizontal line 530. Furthermore, the incoming interface 500 may further include an invalid area. The invalid area is generated by two lines 540 which are parallel with the line 530. When the control button 520 is in the invalid area, the electronic device 1 neither answers the incoming call nor declines the incoming call. As shown in FIG. 6, the circular area 510 is divided into the answer area and the decline area by a vertical line 530. As shown in FIG. 7, the circular area 510 is divided into the answer area and the decline area by two unaligned radial lines 530 which pass through the center of the circular area 510.

In one embodiment, the storage system 10 may be an internal storage system card or an external storage system card, such as a smart media card (SMC), a secure digital card (SDC), a compact flash card (CFC), a multi media card (MMC), a storage system stick (MS), an extreme digital card (XDC), or a trans flash card (TFC). Depending on the embodiment, the electronic device 1 may be a mobile phone, a personal digital assistant (PDA), a handheld game player, a digital camera, or any other portable electronic device.

The gesture controller 40 detects a moving direction and a moving distance of the control button 520 when the control button 520 is dragged by the user. The moving direction is toward the answer area if the control button 520 is dragged from the center of the circular area 510 to the answer area. The moving direction is toward the decline area if the control button 520 is dragged from the center of the circular area 510 to the decline area. The moving distance is a distance from the center of the circular area 510 to a position where the control button 520 reaches.

The unlock controller 60 unlocks the electronic device 1 if the moving distance exceeds a predetermined distance (e.g., a radius of the circular area 510).

The communication unit 70 communicates with other electronic devices and receives incoming calls from other electronic devices.

Figure 2:
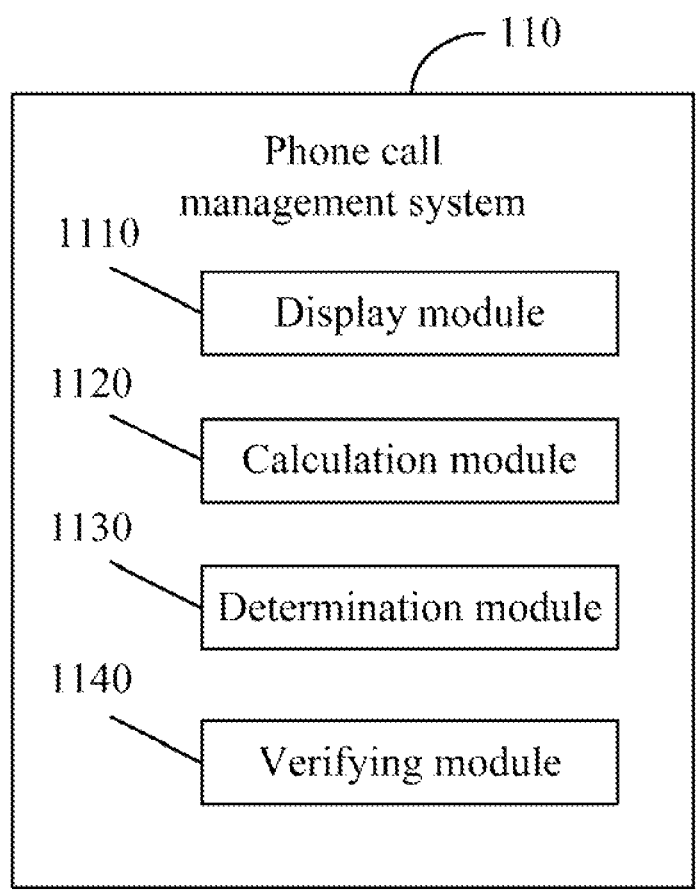
FIG. 2 is a schematic block diagram of one embodiment of the phone call management system in FIG. 1.

FIG. 2 is a block diagram of one embodiment of function modules of the phone call management system 110 in FIG. 1. In one embodiment, the phone call management system 110 includes a display module 1110, a calculation module 1120, a determination module 1130, and a verifying module 1140. The modules 1110-1140 may include computerized code in the form of one or more programs that are stored in the storage system 10. The computerized code includes instructions that are executed by the at least one processor 50 to provide functions for the modules 1110-1140.

The display module 1110 displays an incoming call interface 500 on the touch panel 30 of the electronic device 1 when the electronic device 1 receives the incoming call. For example, if the electronic device 1 receives the incoming call using the communication unit 70, the touch panel 30 may display the first incoming call interface 500.

The calculation module 1120 calculates the moving distance of the control button 520. For example, as shown in FIG. 4, if a user drags the control button 520 to a position A on the touch panel 30, the touch sensor 20 obtains coordinates of the position A and the coordinates of the center of the circular area 510, the calculation module 1120 calculates the moving distance of the control button 520 according to the coordinates of the position A and the coordinates of the center of the circular area 510.

The determination module 1130 determines if the moving distance of the control button is greater than a predetermined distance (e.g., a radius of the circular area 510). Assuming that the radius of the circular area 510 is five centimeters (cm), if the moving distance is calculated as four cm, the moving distance of the control button 520 is determined to be less than the predetermined distance. If the moving distance is calculated as six cm, the moving distance of the control button 520 is determined to be greater than the predetermined distance.

The determination module 1130 further determines a moving direction of the control button 520. As mentioned above, the moving direction is toward the answer area if the control button 520 moves from the center of the circular area 510 to the answer area. The moving direction is toward the decline area if the control button 520 moves from the center of the circular area 510 to the decline area.

The verifying module 1140 answers the incoming call if the moving direction of the control button 520 is toward the answer area, and declines the incoming call if the moving direction of the control button 520 is toward the decline area.

Figure 3:
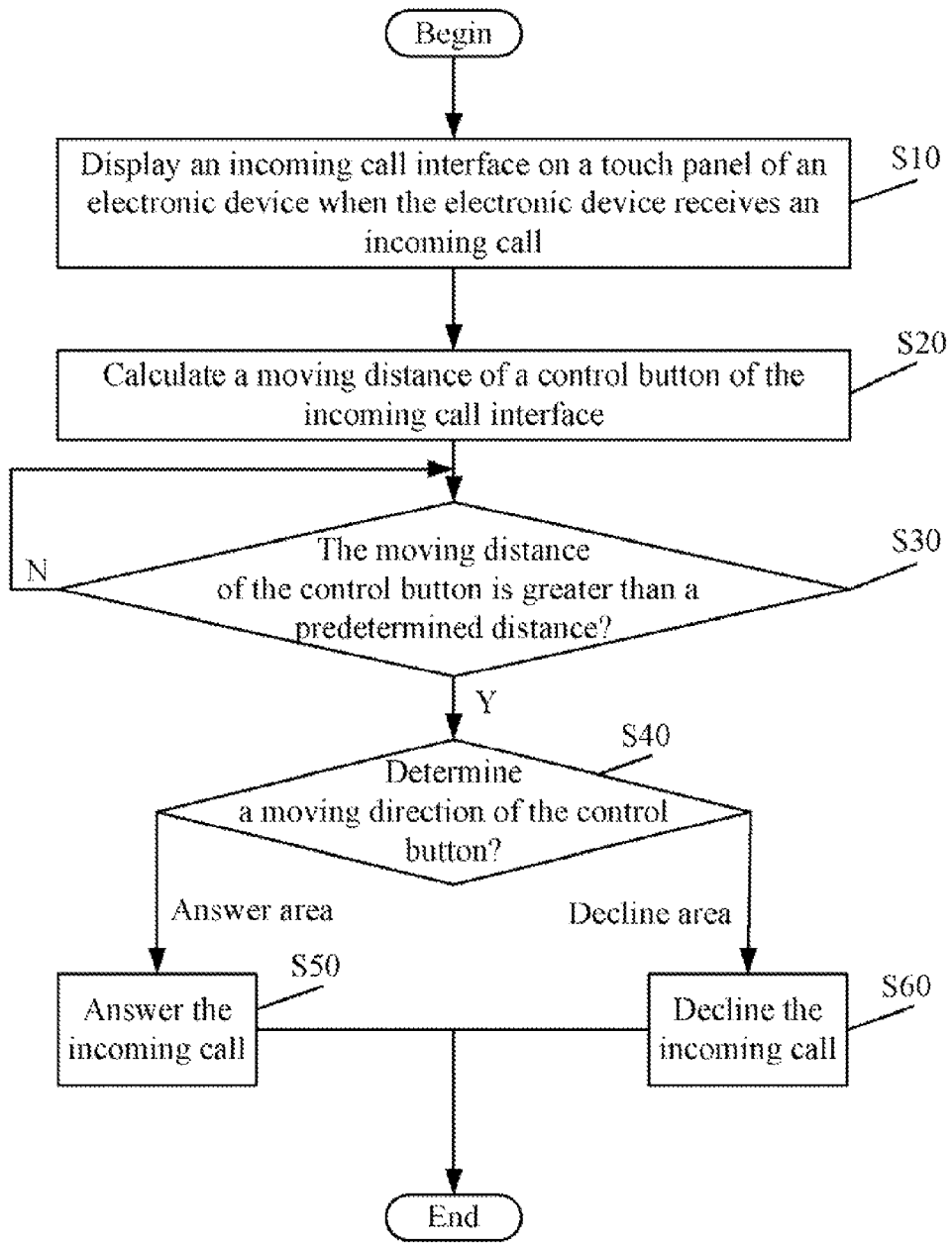
FIG. 3 is a flowchart illustrating one embodiment of a phone call management method.

FIG. 3 is a flowchart of one embodiment of a phone call management method. Depending on the embodiment, additional steps may be added, others deleted, and the ordering of the steps may be changed.

In step S10, the display module 1110 displays an incoming call interface 500 on the touch panel 30 of the electronic device 1 when the electronic device 1 receives the incoming call. For example, if the electronic device 1 receives the incoming call using the communication unit 70, the touch panel 30 may display the first incoming call interface 500.

In step S20, the calculation module 1120 calculates a moving distance of the control button 520.

In step S30, the determination module 1130 determines if the moving distance of the control button 520 is greater than a predetermined distance (e.g., a radius of the circular area 510). If the moving distance of the control button 520 is less than the radius of the circular area 510, step S30 is repeated. In other words, the button 520 moves back to the center of the circle and the electronic device 1 tells the user to try again by displaying a message "try again" on the touch panel 30. Otherwise, if the moving distance of the control button 520 is greater than the radius of the circular area 510, the procedure goes to the step S40. Additionally, if the moving distance of the control button 520 is greater than the radius of the circular area 510, the unlock controller 60 unlocks the electronic device 1.

In step S40, the determination module 1130 further determines a moving direction of the control button 520. If the moving direction of the control button 520 is towards the answer area, the procedure goes to the step S50. Otherwise, if the moving direction of the control button 520 is toward the decline area, the procedure goes to the step S60.

In step S50, the verifying module 1140 answers the incoming call.

In step S60, the verifying module 1140 declines the incoming call.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. An electronic device, comprising:
   a storage system;
   at least one processor; and
   one or more programs stored in the storage system and being executable by the at least one processor, the one or more programs comprising:
   a display module displays an incoming call interface on a touch panel of the electronic device when the electronic device receives the incoming call, wherein the incoming call interface comprises a control button, an answer area and a decline area;
   a calculation module calculates a moving distance of the control button;
   a determination module determines if the moving distance of the control button is greater than a predetermined distance;
   the determination module further determines a moving direction of the control button if the moving distance of the control button is greater than the predetermined distance; and
   a verifying module answers the incoming call if the moving direction of the control button is toward the answer area, and declines the incoming call if the moving direction of the control button is toward the decline area.

2. The electronic device of claim 1, wherein the incoming call interface comprises a circular area, and the circular area is divided into the answer area and the decline area, and the control button is initially positioned at a center of the circular area.

3. The electronic device of claim 1, wherein the incoming call interface comprises an invalid area, and the electronic device neither answers the incoming call nor declines the incoming call when the control button is in the invalid area.

4. The electronic device of claim 1, wherein the moving direction of the control button is toward the answer area if the control button moves to the answer area.

5. The electronic device of claim 1, wherein the moving direction of the control button is toward the decline area if the control button moves to the decline area.

6. The electronic device of claim 1, wherein the electronic device is selected from the group consisting of a mobile phone, a personal digital assistant (PDA), a handheld game player, a digital camera and a tablet computer.

7. A computer-based phone call management method, the method comprising:
- displaying an incoming call interface on a touch panel of the electronic device when the electronic device receives the incoming call, wherein the incoming call interface comprises a control button, an answer area and a decline area;
- calculating a moving distance of the control button;
- determining if the moving distance of the control button is greater than a predetermined distance;
- determining a moving direction of the control button if the moving distance of the control button is greater than the predetermined distance;
- answering the incoming call if the moving direction of the control button is toward the answer area; and
- declining the incoming call if the moving direction of the control button is toward the decline area.

8. The method of claim 7, wherein the incoming call interface comprises a circular area, and the circular area is divided into the answer area and the decline area, and the control button is initially positioned at a center of the circular area.

9. The method of claim 7, wherein the incoming call interface comprises an invalid area, and the electronic device neither answers the incoming call nor declines the incoming call when the control button is in the invalid area.

10. The method of claim 7, wherein the moving direction of the control button is toward the answer area if the control button moves to the answer area.

11. The method of claim 7, wherein the moving direction of the control button is toward the decline area if the control button moves to the decline area.

12. The method of claim 7, wherein the electronic device is selected from the group consisting of a mobile phone, a personal digital assistant (PDA), a handheld game player, a digital camera and a tablet computer.

13. A non-transitory computer-readable medium having stored thereon instructions that, when executed by an electronic device, causing the electronic device to perform a phone call management method, the method comprising:
- displaying an incoming call interface on a touch panel of the electronic device when the electronic device receives the incoming call, wherein the incoming call interface comprises a control button, an answer area and a decline area;
- calculating a moving distance of the control button;
- determining if the moving distance of the control button is greater than a predetermined distance;
- determining a moving direction of the control button if the moving distance of the control button is greater the predetermined distance;
- answering the incoming call if the moving direction of the control button is toward the answer area; and
- declining the incoming call if the moving direction of the control button is toward the decline area.

14. The non-transitory computer-readable medium of claim 13, wherein the incoming call interface comprises a circular area, and the circular area is divided into the answer area and the decline area, and the control button is initially positioned at a center of the circular area.

15. The non-transitory computer-readable medium of claim 13, wherein the incoming call interface comprises an invalid area, and the electronic device neither answers the incoming call nor declines the incoming call when the control button is in the invalid area.

16. The non-transitory computer-readable medium of claim 13, wherein the moving direction of the control button is toward the answer area if the control button moves to the answer area.

17. The non-transitory computer-readable medium of claim 13, wherein the moving direction of the control button is toward the decline area if the control button moves to the decline area.

18. The non-transitory computer-readable medium of claim 13, wherein the electronic device is selected from the group consisting of a mobile phone, a personal digital assistant (PDA), a handheld game player, a digital camera and a tablet computer.

* * * * *